(12) United States Patent
Beck et al.

(10) Patent No.: US 8,094,657 B2
(45) Date of Patent: Jan. 10, 2012

(54) METHOD FOR TRANSMITTING INFORMATION FROM A SOURCE VIA A FIRST NETWORK UNIT AND A NETWORK AND A SECOND NETWORK UNIT TO A DESTINATION

(75) Inventors: Michaël Andries Thomas Beck, Merksem (BE); François Pierre Constant Fredricx, Gentl (BE); Jeanne Emmanuelle Rita De Jaegher, Koekelberg (BE)

(73) Assignee: Alcatel Lucent, Paris (FR)

( * ) Notice: Subject to any disclaimer, the term of this patent is extended or adjusted under 35 U.S.C. 154(b) by 775 days.

(21) Appl. No.: 11/291,964

(22) Filed: Dec. 2, 2005

(65) Prior Publication Data
US 2006/0120364 A1 Jun. 8, 2006

(30) Foreign Application Priority Data
Dec. 3, 2004 (EP) .................................... 04292865

(51) Int. Cl.
*H04L 12/56* (2006.01)
*H04J 3/16* (2006.01)
(52) U.S. Cl. ......................... 370/392; 370/400; 370/469
(58) Field of Classification Search ................... 709/227
See application file for complete search history.

(56) References Cited

U.S. PATENT DOCUMENTS

| | | | |
|---|---|---|---|
| 5,892,912 A * | 4/1999 | Suzuki et al. | 370/395.53 |
| 6,157,647 A | 12/2000 | Husak | |
| 6,181,699 B1 * | 1/2001 | Crinion et al. | 370/392 |
| 6,618,388 B2 | 9/2003 | Yip et al. | |
| 7,277,442 B1 * | 10/2007 | Holmgren et al. | 370/395.53 |
| 7,292,581 B2 * | 11/2007 | Finn | 370/395.53 |
| 2002/0089992 A1 | 7/2002 | Yip et al. | |
| 2002/0091795 A1 * | 7/2002 | Yip | 709/218 |

(Continued)

FOREIGN PATENT DOCUMENTS
EP 1 408 655 A 4/2004

OTHER PUBLICATIONS

M. St. Johns, "RFC 3639: Considerations on the use of a Service Identifier in Packet Headers," Oct. 2003, Network Working Group, p. 1-8.*

(Continued)

*Primary Examiner* — Dang Ton
*Assistant Examiner* — Ryan Kavleski
(74) *Attorney, Agent, or Firm* — Harness, Dickey & Pierce, P.L.C.

(57) ABSTRACT

Methods for transmitting information from sources (7) via first network units (1) and networks (8) and second network units (2) to destinations (9) and using service identifiers such as service virtual local area network identifiers for routing the information through the networks (8) get a reduced complexity by making the service identifiers dependent on destination properties such as destination addresses and by making the service identifiers independent from source properties such as source addresses or customer identifiers. Network units (1,2) comprising customer parts (5) with customer access ports (10) and customer interface ports (11-13) and comprising service parts (6) with service interface ports (21-23) coupled to the customer interface ports (11-13) and service network ports (20) coupled to the service interface ports (21-23) and comprising taggers (62) are provided with detectors (52) for detecting destination properties in the information and selectors (53) for selecting the service identifies in response to detections of the destination properties.

11 Claims, 2 Drawing Sheets

U.S. PATENT DOCUMENTS

| | | | |
|---|---|---|---|
| 2003/0152075 A1* | 8/2003 | Hawthorne et al. | 370/389 |
| 2004/0042454 A1* | 3/2004 | Zabihi et al. | 370/392 |
| 2004/0081180 A1* | 4/2004 | De Silva et al. | 370/402 |
| 2004/0093492 A1* | 5/2004 | Daude et al. | 713/156 |
| 2004/0151120 A1* | 8/2004 | Shankar et al. | 370/249 |
| 2005/0138149 A1* | 6/2005 | Bhatia | 709/220 |
| 2005/0190775 A1* | 9/2005 | Tonnby et al. | 370/401 |
| 2006/0007939 A1* | 1/2006 | Elangovan | 370/395.53 |
| 2006/0245435 A1* | 11/2006 | Sajassi | 370/395.53 |

OTHER PUBLICATIONS

IEEE, "IEEE Std 802.1Q-1998," Mar. 8, 1999, IEEE Standards, p. 1-211.*

IEEE, "IEEE Std 802.1Q-2005," May 19, 2006, IEEE Standards, p. 1-303.*

J. De Jaegher et al, "Multi-service Ethernet broadband access solutions", Alcatel Technology White Paper, 'Online! Sep. 2004, XP002321821.

Van de Voorde et al, "Carrier-grade Ethernet: extending Ethernet into next generation metro networks: Ethernet is widely deployed successfully in metro networks? MPLS could resolve some of Ethernet's major deficiencies, enabling it to become carrier grade", Alcatel Telecommunications Review, Alcatel, Paris, France Jul. 2002 XP007005874.

Tanenbaum A.S., "The Network Layer in the Internet," Computer Networks third edition, Jan. 1, 1996, pp. 419-423, XP002218272.

* cited by examiner

METHOD FOR TRANSMITTING INFORMATION FROM A SOURCE VIA A FIRST NETWORK UNIT AND A NETWORK AND A SECOND NETWORK UNIT TO A DESTINATION

BACKGROUND

1. Field of the Invention

The invention relates to a method for transmitting information from a source via a first network unit and a network and a second network unit to a destination, which method comprises the step of using a service identifier for routing the information through the network.

Examples of such a source and of such a destination are subscribers, examples of such a first network unit and of such a second network unit are access multiplexers, and an example of such a network is a metropolitan Ethernet network.

2. Description of the Related Art

A prior art method is known from U.S. Pat. No. 6,618,388 B2, which discloses in its FIG. 1 a first switch (a first network unit) coupled to a second switch (a second network unit) via a virtual metropolitan area network core (a network). A virtual metropolitan area network identifier (a service identifier) is tagged to data packets (information) for routing the data packets through the virtual metropolitan area network core. This virtual metropolitan area network identifier associates the virtual metropolitan area network with a customer (a source) from which the data packet originated.

The known method is disadvantageous, inter alia, owing to the fact that it is relatively complex. To associate the virtual metropolitan area network with the customer from which the data packet originated, the virtual metropolitan area network identifier is to be derived from a virtual local area network identifier. This virtual local area network identifier needs to be allocated to the customer by the network.

SUMMARY

It is an object of the invention, inter alia, to provide a method as defined above which is relatively simple.

The method according to the invention is characterized in that the service identifier depends on a destination property defined in the information.

By deriving the service identifier from a destination property (a property of the destination) as defined in the information to be transmitted, it is no longer necessary to involve the virtual local area network identifier. As a result, the method according to the invention is relatively simple. The method according to the invention is further advantageous in that it is more reliable and more efficient.

An embodiment of the method according to the invention is characterized in that the service identifier does not depend on a source property defined in the information.

By not deriving the service identifier from a source property (a property of the source) as defined in the information, the method according to the invention is kept as simple as possible.

An embodiment of the method according to the invention is characterized in that the destination property comprises a destination address, the source property comprising a source address or a source identifier.

A destination address (an address of the destination) is available in the information and is therefore easily retrievable.

An embodiment of the method according to the invention is characterized in that the service identifier comprises a service virtual local area network identifier, the source identifier comprising a customer virtual local area network identifier and the addresses comprising medium access control addresses.

A service virtual local area network identifier is also known as S-VLAN, a customer virtual local area network identifier is also known as C-VLAN and medium access control addresses are also known as MAC addresses.

The invention also relates to a first network unit for performing at least a part of a method for transmitting information from a source via the first network unit and a network and a second network unit to a destination, which first network unit comprises a first customer part comprising a customer access port for receiving the information from the source and comprising customer interface ports coupled to the customer access port;

a first service part comprising service interface ports coupled to the customer interface ports and comprising a service network port coupled to the service interface ports for supplying the information to the network; and a tagger for tagging a service identifier to the information.

The first network unit according to the invention is characterized in that the first customer part comprises a first detector coupled to the customer access port for detecting a destination property in the information; and a first selector coupled to the first detector for selecting the service identifier in response to a detection of the destination property.

An embodiment of the first network unit according to the invention is characterized in that a first service identifier is linked to a first customer interface port coupled to a first service interface port and a second service identifier is linked to a second customer interface port coupled to a second service interface port.

By creating one combination of customer interface port and service interface port per service identifier, the construction of the first network unit is kept simple.

An embodiment of the first network unit according to the invention is characterized in that the first network unit further comprises a first memory for storing a relationship between a source property in the information and a port of the first customer part.

By storing a relationship between a source property such as a source address as defined in the information and a port of the first customer part such as a customer access port or a customer interface port, the first network unit has got learning capabilities and can respond efficiently in case the destination sends back information to the source.

An embodiment of the first network unit according to the invention is characterized in that the first network unit further comprises a first filter for filtering the information in response to a detection of the destination property comprising a broadcast indication.

By filtering the information to be broadcasted, which information comprises a destination property with a broadcast indication, such as a broadcast destination address (an address defining a number of destinations), an amount of traffic to be broadcasted can be reduced. As a result, the security, the reliability and the efficiency are further increased.

An embodiment of the first network unit according to the invention is characterized in that the first network unit further comprises a first agent for inspecting sessions and for responding to queries.

By inspecting sessions such as dynamic host configuration protocol sessions and by responding to queries such as address resolution protocol queries, broadcast floodings can be avoided.

The invention yet also relates to a first customer part for use in a first network unit for performing at least a part of a method for transmitting information from a source via the first network unit and a network and a second network unit to a destination, which first network unit comprises the first customer part comprising a customer access port for receiving the information from the source and comprising customer interface ports coupled to the customer access port;

a first service part comprising service interface ports coupled to the customer interface ports and comprising a service network port coupled to the service interface ports for supplying the information to the network; and a tagger for tagging the service identifier to the information.

The first customer part is characterized in that the first customer part comprises a first detector coupled to the customer access port for detecting the destination property in the information; and a first selector coupled to the first detector for selecting the service identifier in response to a detection of the destination property.

Embodiments of the first customer part according to the invention correspond with the embodiments of the first network unit according to the invention.

The invention further relates to a second network unit for performing at least a part of a method for transmitting information from a source via a first network unit and a network and the second network unit to a destination, which second network unit comprises a second service part comprising a service network port for receiving the information from the network and comprising service interface ports coupled to the service network port;

a second customer part comprising customer interface ports coupled to the service interface ports and comprising a customer access port coupled to the customer interface ports for supplying the information to the destination; and a remover for removing a service identifier from the information.

The second network unit according to the invention is characterized in that the second customer part comprises a second memory for storing a relationship between a source property in the information and a port of the second customer part.

By storing a relationship between a source property such as a source address as defined in the information and a port of the second customer part such as a customer access port or a customer interface port, the second network unit has got learning capabilities and can respond efficiently in case the destination sends back information to the source.

An embodiment of the second network unit according to the invention is characterized in that a first service identifier is linked to a first customer interface port coupled to a first service interface port and a second service identifier is linked to a second customer interface port coupled to a second service interface port.

By creating one combination of customer interface port and service interface port per service identifier, the construction of the second network unit is kept simple.

The invention yet further relates to a second customer part for use in a second network unit for performing at least a part of a method for transmitting information from a source via a first network unit and a network and the second network unit to a destination, which second network unit comprises a second service part comprising a service network port for receiving the information from the network and comprising service interface ports coupled to the service network port;

the second customer part comprising customer interface ports coupled to the service interface ports and comprising a customer access port coupled to the customer interface ports for supplying the information to the destination; and a remover for removing the service identifier from the information.

The second customer part according to the invention is characterized in that the second customer part comprises a second memory for storing a relationship between a source property in the information and a port of the second customer part.

Embodiments of the second customer part according to the invention correspond with the embodiments of the second network unit according to the invention.

And the invention relates to a signal comprising information to be transmitted from a source via a first network unit and a network and a second network unit to a destination, which information is tagged with a service identifier for routing the information through the network.

The signal according to the invention is characterized in that the service identifier depends on a destination property defined in the information.

Embodiments of the first and second network units according to the invention and of the first and second customer parts according to the invention and of the signal according to the invention correspond with the embodiments of the method according to the invention.

The invention is based upon an insight, inter alia, that conversions of customer identifiers into service identifiers result in prior art methods being complex, and is based upon a basic idea, inter alia, that—to keep the method according to the invention simple—a destination property is to be converted into a service identifier.

The invention solves the problem, inter alia, to provide a method as defined above which is relatively simple, and is advantageous, inter alia, in that the method is more reliable and more efficient.

These and other aspects of the invention will be apparent from and elucidated with reference to the embodiments(s) described hereinafter.

DETAILED DESCRIPTION

Figure 1:
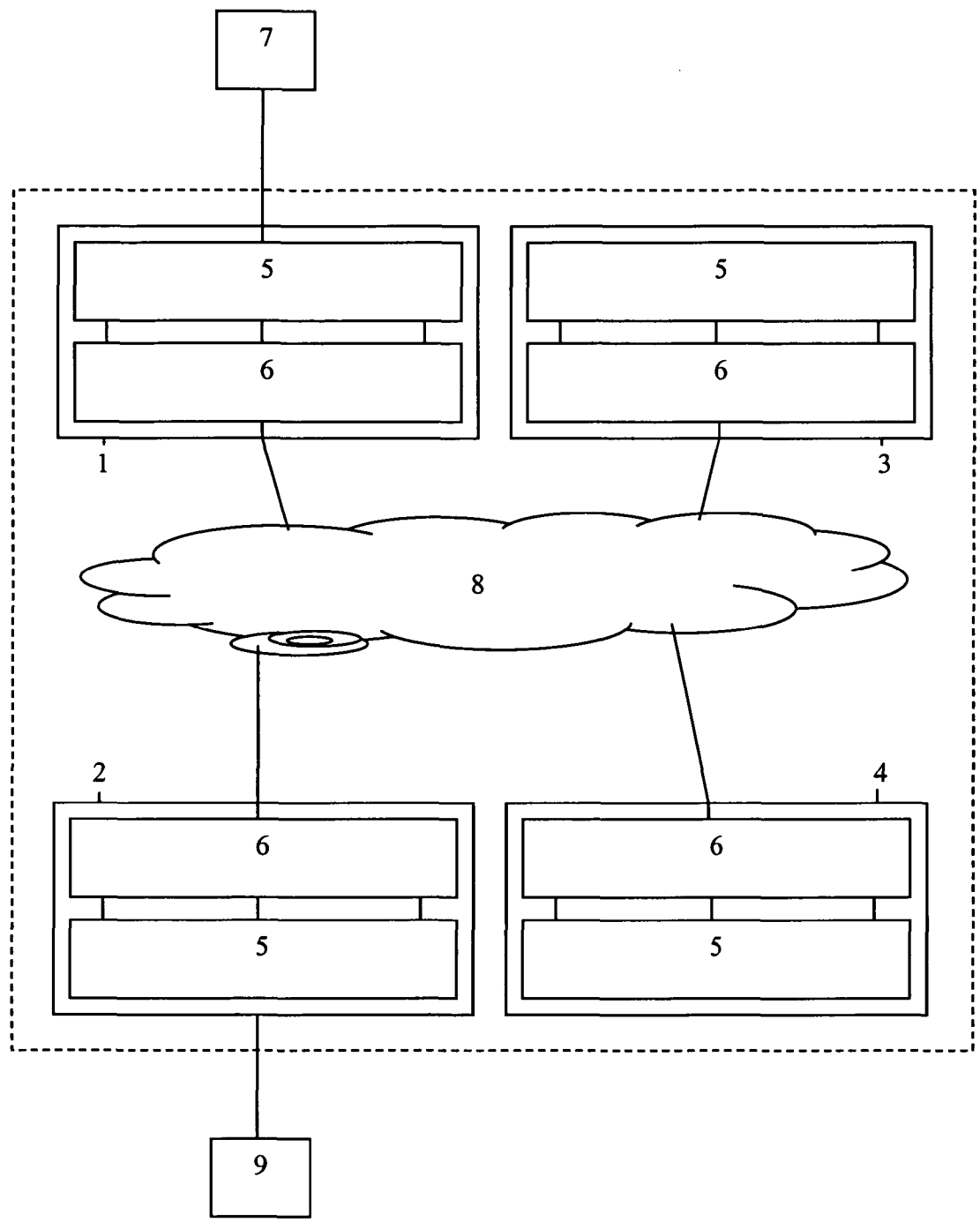
FIG. 1 shows diagrammatically a system comprising a first network unit according to the invention coupled to a source, a second network unit according to the invention coupled to a destination and a network coupled to both network units according to the invention.

The system shown in FIG. 1 comprises a first network unit 1 according to the invention coupled to a source 7, a second network unit 2 according to the invention coupled to a destination 9 and a network 8 coupled to both network units 1,2 according to the invention. Further network units 3,4 according to the invention are also coupled to the network 8. The network units 1-4 according to the invention each comprise a customer part 5 according to the invention and a service part 6 according to the invention, shown in greater detail in FIG. 2.

Figure 2:
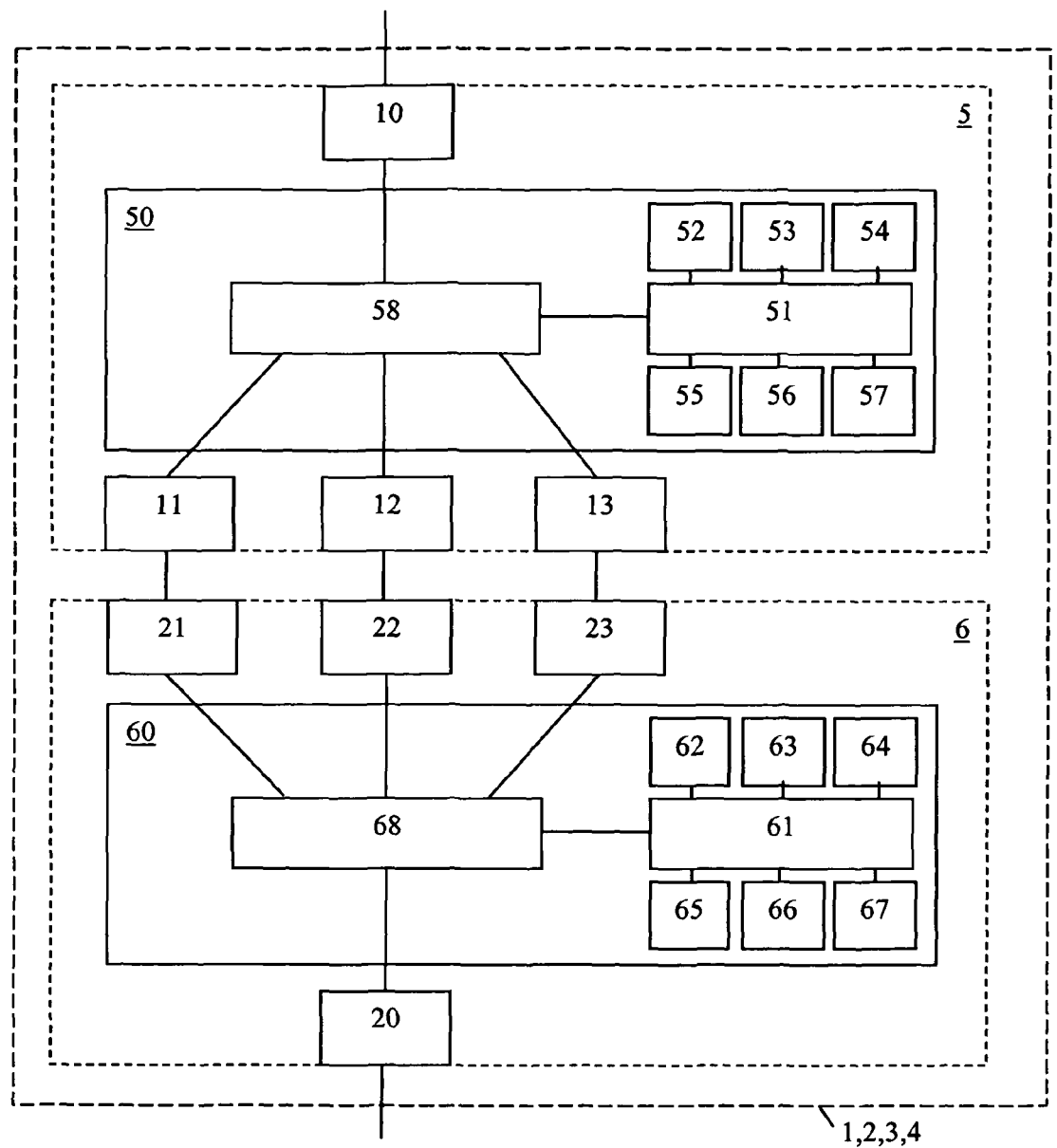
FIG. 2 shows diagrammatically a network unit according to the invention comprising a customer part according to the invention.

The network units 1-4 according to the invention shown in FIG. 2 each comprise a customer part 5 according to the invention and a service part 6 according to the invention. The customer part 5 comprises a customer access port 10 coupled via a coupler 50 to customer interface ports 11-13. The service part 6 comprises service interface ports 21-23 coupled to the customer interface ports 11-13 and coupled via a coupler 60 to a service network port 20. The coupler 50 comprises a switch 58 coupled to the ports 10-13 and to a processor system 51, which is further coupled to a detector 52, a selector 53, a memory 54, a filter 55, an agent 56 and a further memory 57. The coupler 60 comprises a switch 68 coupled to the ports 20-23 and to a processor system 61, which is further coupled to a tagger 62, a remover 63, a memory 64, a detector 65, a filter 66 and a further memory 67.

The source 7 and the destination 9 are for example subscriber equipment, the network units 1-4 are for example access multiplexers, and the network 8 is for example a metropolitan Ethernet network.

In a prior art situation, such as for example disclosed in U.S. Pat. No. 6,618,388 B2, a virtual metropolitan area network identifier (a service identifier) is tagged to data packets (information) for routing the data packets through the network. So, for transmitting information from a source 7 via a first network unit 1 and a network 8 and a second network unit 2 to a destination 9, a method comprises a step of using a service identifier for routing the information through the network 8. This service identifier associates the network with a customer (a source) from which the data packet originated. This makes the known method relatively complex. To associate the network with the customer from which the data packet originated, the virtual metropolitan area network identifier is to be derived from a virtual local area network identifier. This virtual local area network identifier needs to be allocated to the customer by the network.

According to the invention, the service identifier depends on a destination property defined in the information. So, a method according to the invention is defined by deriving the service identifier from a destination property (a property of the destination) as defined in the information to be transmitted. Then, it is no longer necessary to involve the virtual local area network identifier. As a result, the method according to the invention is relatively simple. The method according to the invention is further advantageous in that it is more reliable and more efficient.

Preferably, the service identifier does not depend on a source property (a property of the source) as defined in the information, to keep the method according to the invention as simple as possible. The destination property for example comprises a destination address (an address of the destination), and the source property for example comprises a source address or a source identifier. The service identifier for example comprises a service virtual local area network identifier or S-VLAN, the source identifier for example comprises a customer virtual local area network identifier C-VLAN and the addresses for example comprise medium access control addresses or MAC addresses.

To be able to perform the method according to the invention, the network units 1-4 according to the invention are designed and operate as follows.

The network unit 1 comprises the customer part 5 comprising the customer access port 10 for receiving the information from the source 7. This information for example comprises packets, messages, frames or protocol data units. The customer part 5 further comprises the customer interface ports 11-13 coupled to the customer access port 10 via the coupler 50. The network unit 1 further comprises the service part 6 comprising the service interface ports 21-23 coupled to the customer interface ports 11-13 and comprising the service network port 20 coupled to the service interface ports 21-23 via the coupler 60 for supplying the information to the network 8. The network unit 1 further comprises the tagger 62 for tagging a service identifier to this information. At the hand of this service identifier (S-VLAN), the information is routed through the network 8. The customer part 5 comprises the detector 52 coupled to the customer access port 10 via the processor system 51 and the switch 58 for detecting the destination property (destination MAC address) in the information. Such a destination property is for example to be found at a predefined location in the information, such as a predefined field of a header. The customer part 5 further comprises the selector 53 coupled to the detector 52 via the processor system 51 for selecting the service identifier (S-VLAN) in response to a detection of the destination property (destination MAC address). Thereto, a table can be used. In case of the destination property (destination MAC address) being used before, the service identifier (S-VLAN) can be retrieved from this table. In case of the destination property (destination MAC address) being used for the first time, a default service identifier (S-VLAN) is to be generated.

Preferably, a first service identifier is linked to a first customer interface port 11 coupled to a first service interface port 21 and a second service identifier is linked to a second customer interface port 12 coupled to a second service interface port 22. In this case, a selection of a service identifier (S-VLAN) corresponds with a selection of an interface port 11,12 and vice versa.

The network unit 1 may further comprise the memory 54 for storing a relationship between a source property in the information and a port 10-13 of the customer part 5. By storing a relationship between a source property such as a source address (source MAC address) as defined in the information and a port of the customer part 5 such as a customer access port 10 or a customer interface port 11-13, the network unit 1 has got learning capabilities and can respond efficiently in case the destination 9 sends back information to the source 7. The source property (source MAC address) can be detected via the detector 52.

The network unit 1 may further comprise the filter 55 for filtering the information in response to a detection of the destination property (destination MAC address) comprising a broadcast indication. By filtering the information to be broadcasted, which information comprises a destination property with a broadcast indication, such as a broadcast destination address (broadcast destination MAC address), an amount of traffic to be broadcasted can be reduced. The information to be broadcasted is for example broadcasted to allow the source 7 to report itself at the network units 1-4 or to allow the source 7 to collect information about an other entity without knowing how to particularly reach this specific entity. As a result, the security, the reliability and the efficiency of the method and the system are further increased. The filtering is performed by detecting and in response to said detecting broadcasting less copies or no copies at all.

The network unit 1 may further comprise the agent 56 for inspecting sessions and for responding to queries. By inspecting sessions such as dynamic host configuration protocol sessions and by responding to queries such as address resolution protocol queries, broadcast floodings can be avoided. In general, inspecting is performed by detecting, and responding is performed by generating in response to said detecting.

The network unit 2 comprises the service part 6 comprising the service network port 20 for receiving the information from the network 8. This information for example comprises packets, messages, frames or protocol data units, and has been tagged with the service identifier (S-VLAN). The service part 6 further comprises the service interface ports 21-23 coupled to the service network port 20 via the coupler 60. The network unit 2 further comprises the second customer part 5 comprising the customer interface ports 11-13 coupled to the service interface ports 21-23 and further comprising the customer access port 10 coupled to the customer interface ports 11-13 via the coupler 50 for supplying the information to the destination 9. The network unit 2 further comprises the remover 63 for removing the service identifier (S-VLAN) from the information. The customer part 5 comprises the further memory 57 for storing a relationship between a source property (source MAC address) in the information and a port 10-13 of the customer part 5. By storing a relationship between a source property (source MAC address) as defined in the information and a port 10-13 of the customer part 5 such as a customer access port 10 or a customer interface port 11-13, the network unit 2 has got learning capabilities and can respond efficiently in case the destination 9 sends back information to the source 7. The source property (source MAC address) can be detected via the detector 52.

Preferably, a first service identifier is linked to a first customer interface port 11 coupled to a first service interface port 21 and a second service identifier is linked to a second customer interface port 12 coupled to a second service interface port 22. In this case, one service identifier (S-VLAN) corresponds with one interface port 11,12 and vice versa.

The tagger 62 and the remover 63 form part of the service part 6. Alternatively, they might be located in the customer part 5 or outside the customer part 5 and the service part 6. The service part 6 might further comprise the memory 64, the detector 65, the filter 66 and the further memory 67 respectively having similar functions as the memory 54, the detector 52, the filter 55 and the further memory 57 respectively as described above.

So, in a minimum situation, the network unit 1 comprises the customer part 5 comprising the ports 10-13 and the service part 6 comprising the ports 20-23 and the tagger 62, with customer part 5 comprising the detector 52 and the selector 53. And in this minimum situation, the network unit 2 comprises the customer part 5 comprising the ports 10-13 and the service part 6 comprising the ports 20-23 and the remover 63, with the customer part 5 comprising the further memory 57. In a more usual situation, both network units 1 and 2 will be relatively identical. The elements 52-57 (62-67) may partly or entirely be integrated into the processor system 51 (61) and/or may be hardware, software or a mixture of both.

A signal according to the invention comprises the information to be transmitted from the source 7 via the network unit 1 and the network 8 and the network unit 2 to the destination 9, which information is tagged with the service identifier (S-VLAN) for routing the information through the network 8, whereby the service identifier (S-VLAN) depends on the destination property (destination MAC address) defined in the information and does not depend on the source property (source MAC address) or the customer identifier (C-VLAN).

Although only one customer access port 10 and only one service network port 20 are shown, more than one may be present. Instead of three customer interface ports 11-13 and three service interface ports 21-23, two or four or more than four may be present. Other destination properties may be used, the destination MAC address is just an example.

The network units 1-4 may comprise digital subscriber line access multiplexers or bridges with the customer parts 5 and the service parts 6 being bridge components such as C-VLAN and S-VLAN aware bridge components as for example defined in IEEE DRAFT P802.1AD/D2.0.

The expression "for" in for example "for transmitting", "for routing", "for receiving", "for supplying" etc. does not exclude that other functions are performed as well, simultaneously or not. The expressions "X coupled to Y" and "a coupling between X and Y" and "coupling/couples X and Y" etc. do not exclude that an element Z is in between X and Y. The expressions "P comprises Q" and "P comprising Q" etc. do not exclude that an element R is comprised/included as well. The terms "a" and "an" do not exclude the possible presence of one or more pluralities.

The step of using a service identifier for routing the information through the network does not exclude further steps, like for example, inter alia, the steps described for FIGS. 1 and 2.

The invention claimed is:

1. A method for transmitting information from a source via a first network unit and a network and a second network unit to a destination, the method comprising:
   using, by at least one of the first network unit and the second network unit, a service identifier for routing the information through the network, the service identifier includes a service virtual local area network identifier and depends on a destination property defined in the information, the service identifier not being derived by a source property defined in the information and not including the source property, the source property including a source identifier;
   wherein the destination property includes a destination address, and wherein the source identifier includes a customer virtual local area network identifier.

2. The method as defined in claim 1, wherein the destination address include a medium access control address.

3. A first network unit for performing at least a part of a method for transmitting information from a source via the first network unit and a network and a second network unit to a destination, the first network unit comprising:
   a first customer part includes a customer access port for receiving the information from the source and including customer interface ports coupled to the customer access port;
   a first service part includes service interface ports coupled to the customer interface ports and includes a service network port coupled to the service interface ports for supplying the information to the network; and
   a tagger for tagging a service identifier to the information, the service identifier including a service virtual local area network identifier and not depending on a source property defined in the information, the source property including a source identifier,
   wherein the first customer part includes,
      a first detector coupled to the customer access port for detecting a destination property in the information; and
      a first selector coupled to the first detector for selecting the service identifier in response to a detection of the destination property,
   wherein the destination property includes a destination address,
   wherein the source identifier includes a customer virtual local area network identifier.

4. The first network unit as defined in claim 3, wherein the service identifier includes a first service identifier and a second service identifier, such that the first service identifier is associated with a first customer interface port coupled to a first service interface port and the second service identifier is associated with a second customer interface port coupled to a second service interface port.

5. The first network unit as defined in claim 3, wherein the first network unit further comprises:
   a first memory for storing a relationship between the source property in the information and a port of the first customer part.

6. The first network unit as defined in claim 3, wherein the first network unit further comprises:
   a first filter for filtering the information in response to a detection of the destination property including a broadcast indication.

7. The first network unit as defined in claim 3, wherein the first network unit further includes a first agent for inspecting sessions and for responding to queries.

8. A second network unit for performing at least a part of a method for transmitting information from a source via a first network unit and a network and the second network unit to a destination, the second network unit comprising:
   a second service part includes a service network port for receiving the information from the network and includes service interface ports coupled to the service network port;
   a second customer part including customer interface ports coupled to the service interface ports and including a customer access port coupled to the customer interface ports for supplying the information to the destination; and
   a remover for removing a service identifier from the information, the service identifier including a service virtual local area network identifier, the service identifier depends on a destination property defined in the information, the service identifier not being derived by a source property defined in the information and not including the source property, the source property including a source identifier, wherein the second customer part includes a second memory storing a relationship between the source property in the information and a port of the second customer part;
   wherein the destination property includes a destination address, and wherein the source identifier includes a customer virtual local area network identifier.

9. The second network unit as defined in claim 8, wherein the service identifier includes a first service identifier and a second service identifier, such that the first service identifier is associated with a first customer interface port coupled to a first service interface port and the second service identifier is associated with a second customer interface port coupled to a second service interface port.

10. A second customer part for use in a second network unit for performing at least a part of a method for transmitting information from a source via a first network unit and a network and the second network unit to a destination, the second network unit comprising:
   a second service part includes a service network port for receiving the information from the network and includes service interface ports coupled to the service network port;
   the second customer part includes customer interface ports coupled to the service interface ports and including a customer access port coupled to the customer interface ports for supplying the information to the destination; and
   a remover for removing a service identifier from the information, the service identifier including a service virtual local area network identifier, the service identifier depends on a destination property defined in the information, the service identifier not being derived by a source property defined in the information and not including the source property, the source property including a source identifier, wherein the second customer part includes, a second memory storing a relationship between the source property in the information and a port of the second customer part;
   wherein the destination property includes a destination address, and wherein the source identifier includes a customer virtual local area network identifier.

11. A method for transmitting information from a source via a first network unit and a network and a second network unit to a destination, the method comprising:
   tagging the information with a service identifier for routing the information through the network, the service identifier including a service virtual local area network identifier and depending on a destination property defined in the information, the service identifier not being derived by a source property defined in the information and not including the source property, the source property including a source identifier;
   wherein the destination property includes a destination address, and wherein the source identifier includes a customer virtual local area network identifier.

* * * * *